(12) United States Patent
Sloan et al.

(10) Patent No.: US 6,920,840 B1
(45) Date of Patent: Jul. 26, 2005

(54) APPARATUS FOR INSTALLING AND REMOVING TEAT CUP LINERS

(75) Inventors: Don M. Sloan, Quincy, IL (US); Patrick E. Sloan, Quincy, IL (US)

(73) Assignee: Sloan Manufacturing, Inc., Quincy, IL (US)

( * ) Notice: Subject to any disclaimer, the term of this patent is extended or adjusted under 35 U.S.C. 154(b) by 24 days.

(21) Appl. No.: 10/822,931

(22) Filed: Apr. 13, 2004

(51) Int. Cl.$^7$ .................................................. A01J 5/04
(52) U.S. Cl. .................................................. 119/14.47
(58) Field of Search .......................... 119/14.01–14.03, 119/14.1, 14.08, 14.18, 14.46, 14.47, 14.48, 119/14.49; 254/250, 253; 29/235, 235.5, 29/426.6

(56) References Cited

U.S. PATENT DOCUMENTS

| | | | |
|---|---|---|---|
| 3,115,116 A * | 12/1963 | Lorell et al. .............. | 119/14.08 |
| 3,967,587 A | 7/1976 | Noorlander | |
| 3,973,521 A | 8/1976 | Duncan | |
| 4,269,143 A | 5/1981 | Erbach | |
| 4,459,939 A | 7/1984 | Noorlander | |
| 4,756,274 A * | 7/1988 | Rubino .................... | 119/14.08 |
| 5,007,378 A | 4/1991 | Larson | |
| 6,058,879 A * | 5/2000 | Miefalk ................... | 119/14.47 |
| 6,116,188 A * | 9/2000 | van der Lely ........... | 119/14.02 |
| 6,308,656 B1 | 10/2001 | Milbrath et al. | |
| 6,357,387 B1 * | 3/2002 | Johannesson ........... | 119/14.47 |
| 6,427,624 B1 | 8/2002 | Briggs et al. | |
| 6,598,560 B1 * | 7/2003 | van den Berg .......... | 119/14.08 |

OTHER PUBLICATIONS

G.M. Jones. The Role of Milking Equipment in Mastitis, Virginia Cooperative Extension. Dairy, 8 pp., Publication 404-742, Reprinted 1999, Virginia.
Michel A. Wattiaux, Principles of Milking, Babcock Institute, pp. 81-84, Wisconsin. Admitted prior art.
Milking Management Services 2001, Tech Notes, 6 pp., printed from http://www.milkingmanagement.co.uk/machinetesting/tecnotes.htm Aug. 4, 2002.
Proper Use and Care of Inflations, Producing Quality Milk, pp. 96-97. Admitted prior art.

* cited by examiner

Primary Examiner—Thomas Price
(74) Attorney, Agent, or Firm—Senniger Powers

(57) ABSTRACT

An apparatus for installing and removing a teat cup liner (or "inflation") from a shell has a fixture which holds and retains the shell in position. A pair of shoes is capable of moving to engage a portion of the liner projecting from the shell to pull the liner downwardly. In an installation mode, the liner is pulled so that a sealing ring on the liner moves through a restricted opening into a sealing relationship with the shell at one end. The resiliency of the liner also causes a seal to be formed at the other end of the shell. In a removal mode, the liner is stretched by movement of the shoes in the same way as installation. A cutter of the apparatus is then activated to sever an end portion of the liner, including the sealing ring from the remainder of the liner, releasing the liner from the shell.

19 Claims, 11 Drawing Sheets

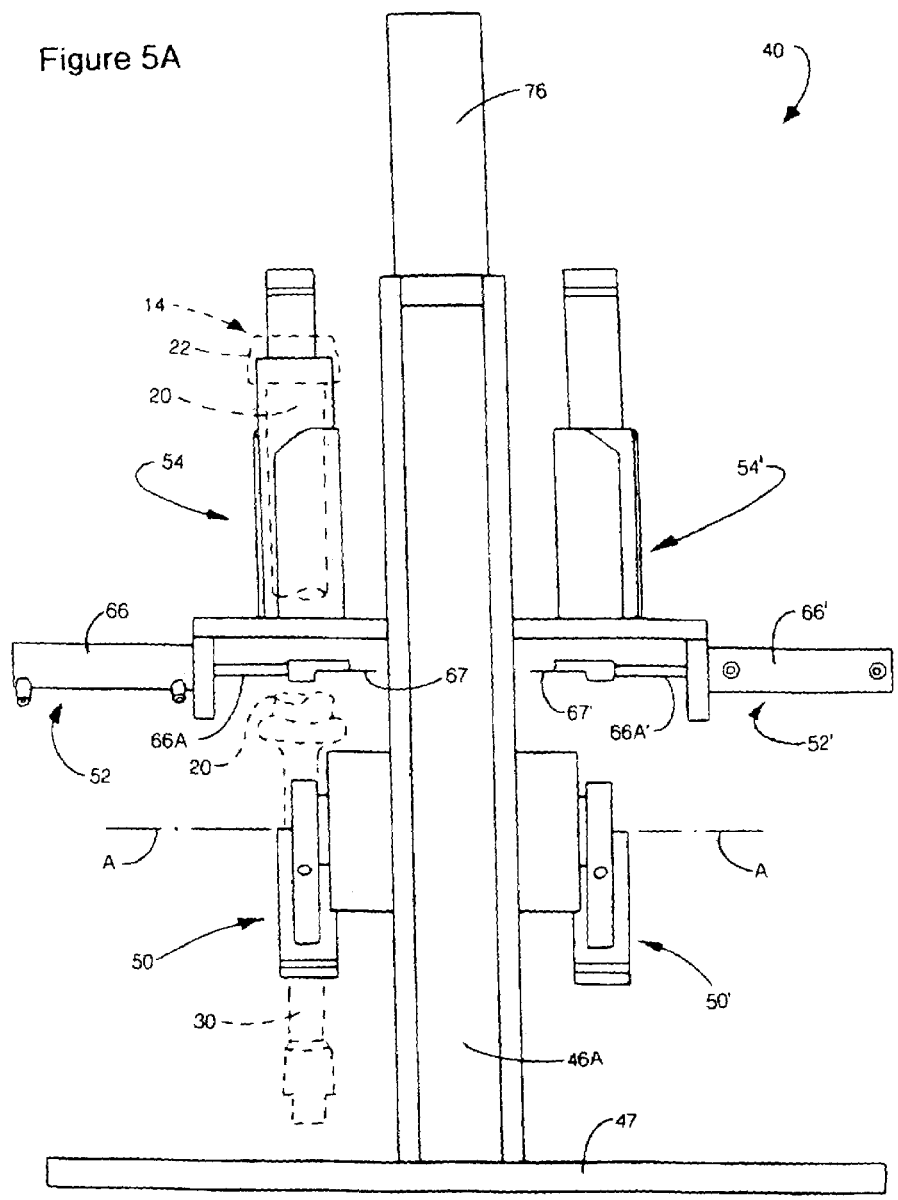

APPARATUS FOR INSTALLING AND REMOVING TEAT CUP LINERS

BACKGROUND OF THE INVENTION

This invention relates generally to teat cup assemblies for vacuum-operated milking machines including a rigid shell and a flexible liner, and in particular to an apparatus for installing and/or removing the flexible liner from the shell.

Automatic milking machines employ teat cup assemblies having a hollow, rigid outer shell and a resilient liner (also called an "inflation") including a tubular body installed within the shell in a manner to form a seal at both ends of the shell. The terms "inflation" and "liner" are used interchangeably in the trade. The shell and liner define an annular chamber there between to which a pulsating vacuum can be applied. The cow's teat is inserted into the upper end of the liner and a milking tube portion on the lower end is connected to a manifold (called a "claw") of the milking machine. During the milking operation, a pulsator switches on and off to apply a vacuum to the chamber in the teat shell 12 that causes the liner 14 to expand, increasing its internal diameter and relieving pressure on the teat. The pulsator can then vent the chamber to atmosphere and the liner 14 contracts, squeezing the teat to express milk therefrom into the liner.

One type of conventional teat cup assembly 10 is shown in FIGS. 1 and 2 and has a generally cylindrical shell 12 and removable liner 14 (the reference numbers indicating their subjects generally). The shell 12 has a tubular body 15, a lower end 16 including an opening 17 of reduced diameter and an upper end terminating in a rim 18. Located in the side of the shell 12 is an air tube 19 connected via suitable tubing (not shown) in communication with the pulsator which alternately vents to atmosphere and applies a vacuum to an annular chamber between the interior wall of the shell 12 and a portion of the liner 14 inside the shell to alternately squeeze and release the teat to express milk. The shell 12 can be made from a metal, such as stainless steel, or a synthetic thermoplastic or thermosetting material, including transparent or translucent materials so that the milking operation of the liner 14 can be observed.

The liner 14 has an elongated, generally cylindrical suction sleeve or barrel section 20 which fits inside the shell 12 and a head section 22 which has a circular opening 24 for receiving a cow's teat. The head section 22 has a peripheral downwardly extending skirt or cuff 26 which surrounds the rim 18 of the upper end portion of the shell 12. The cuff 26 is spaced radially outwardly from the outer wall of the liner 14 to define an annular recess which receives and sealingly engages the rim 18 of the shell 12. The liner 14 also has a lower section 30 which fits through the opening 17 in the lower end 16 of the shell 12. A sealing ring 28 on the liner 14 is sized to be pulled through the opening 17 and sealingly engage the shell 12 so that the liner is elongated and under tension when assembled within the shell. In this way, the liner 14 seals with the shell 12 at the cuff 26 and the sealing ring 28 and makes the annular chamber airtight. The liner 14 may be a one-piece unit or a multiple-piece unit. The liner 14 can be made from any of a variety of conventional elastomeric materials such as synthetic or natural rubber. The cuff 26 has an upper alignment mark 27 that corresponds to another lower alignment mark 29 directly under the sealing ring 28 on the lower section 30. When installed correctly, mark 27 on the cuff 26 and mark 29 on the lower section 30 must be aligned with each other to avoid twisting.

The construction of the teat cup assembly is conventional and may be varied without affecting the scope of the present invention.

During milking operation, the barrel section 20 of the liner 14 is subjected to repeated alternating stretching and releasing by the vacuum system, which eventually breaks down the barrel section 20 and results in an inefficient or incomplete expression of milk. Additionally, the liner 14 is vulnerable to deterioration caused by scalding water, teat treatment preparations, cleaning chemicals, and an accumulation of butterfat. Also the head section 22 and lower section 30 can be subjected to a number of potentially damaging conditions such as flexing when not in use or impacts, e.g., dropping on a concrete floor or drain grating of a milking stall, banging into a milking stall wall, another teat cup assembly 10 or other equipment, or being stepped on by a cow. Any or all of these conditions could result in the downgrading or rejection of the bulk milk due to contamination, as well as unsafe for the health of the cow. Accordingly, it is recommended by all manufacturers of the liner 14 that replacement be routinely scheduled in order to maintain a uniform and efficient operation, maximize milk yield, and provide gentle, fast, and safe milking to preserve udder health.

SUMMARY OF THE INVENTION

An apparatus of the present invention is for manipulating a teat cup assembly used for milking a domestic animal. The teat cup assembly includes a shell and a resilient liner adapted to receive the animal's teat. The liner is capable of extending through the shell while being retained by the shell. Generally, the apparatus comprises a fixture sized and shaped for receiving and holding the shell having the liner retained therein, and a puller disposed relative to the fixture to grip and pull the liner relative to the fixture.

In another aspect of the present invention, the apparatus as set forth above, further including a frame mounting the fixture and puller.

Other objects and features of the present invention will be in part apparent and in part pointed out hereinafter.

BRIEF DESCRIPTION OF THE DRAWINGS

FIGS. 5 and 5A are front elevations of the apparatus of FIG. 4;

Corresponding reference characters indicate corresponding parts throughout the views of the drawings.

DETAILED DESCRIPTION OF THE PREFERRED EMBODIMENT

Figure 1:
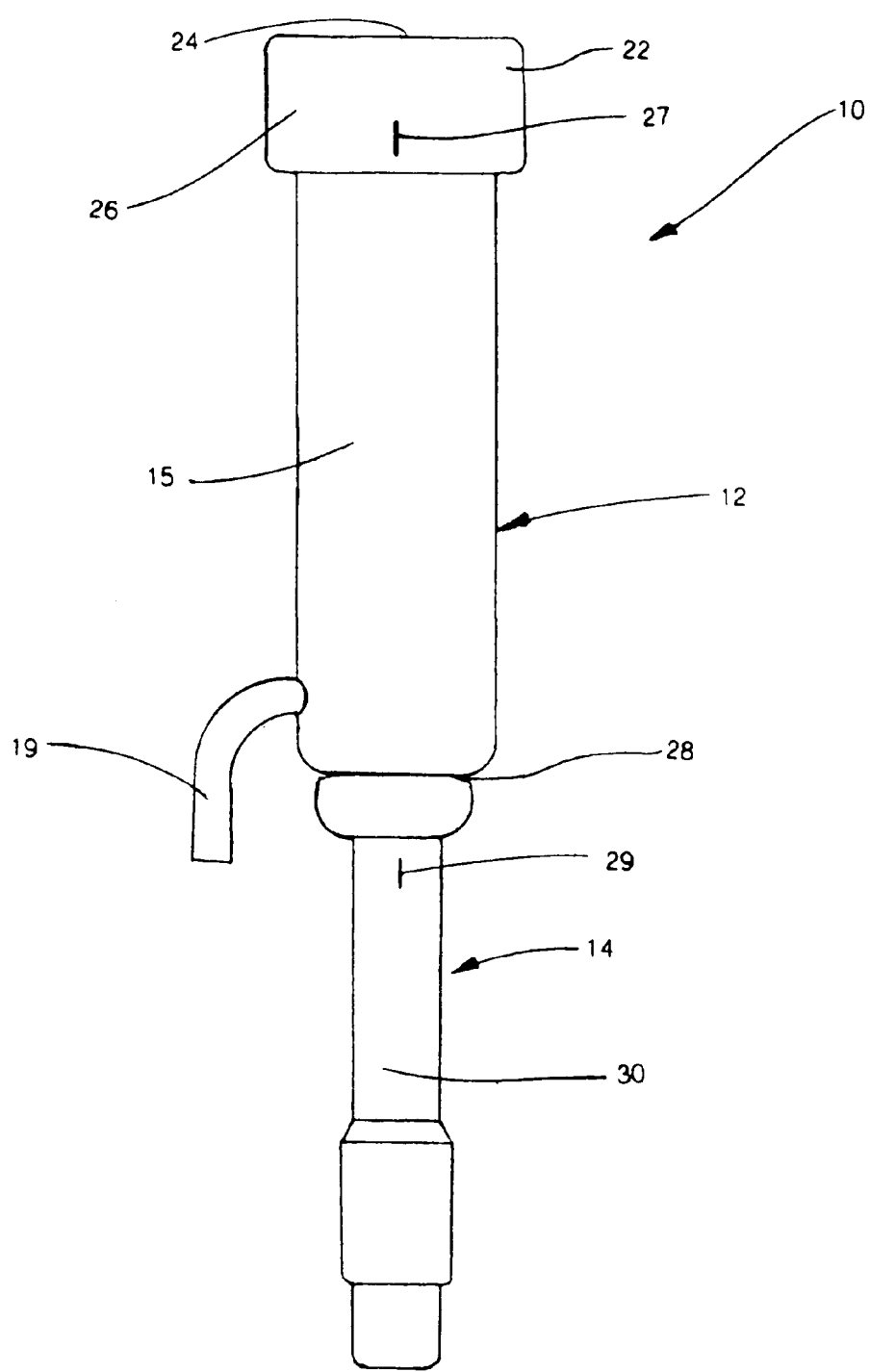
FIG. 1 is an elevation of a prior art teat cup assembly.
Figure 2:
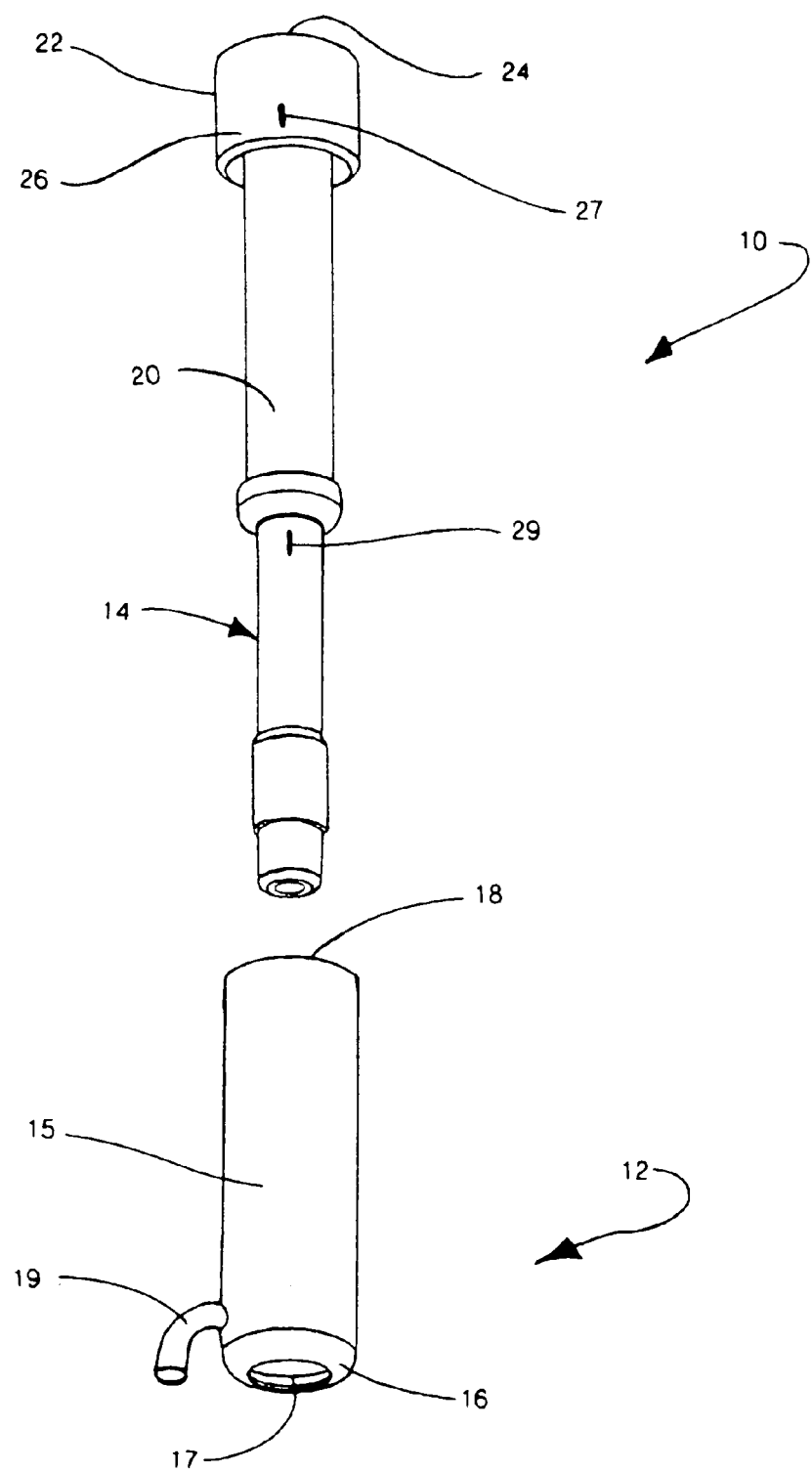
FIG. 2 is the elevation of FIG. 1 with a liner exploded from the shell.
Figure 3:
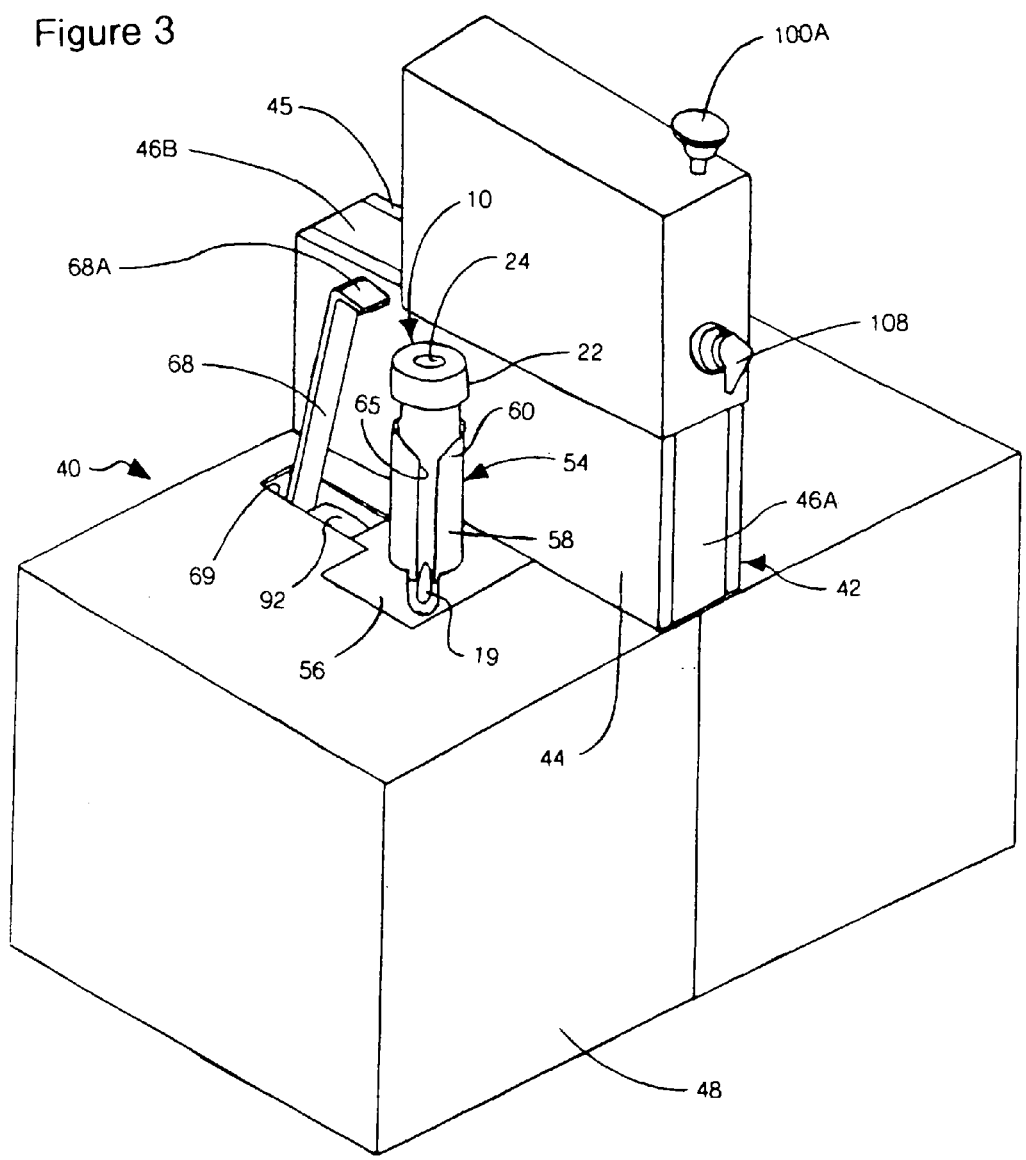
FIG. 3 is a perspective of an apparatus for assembling and disassembling teat cup assemblies.
Figure 4:
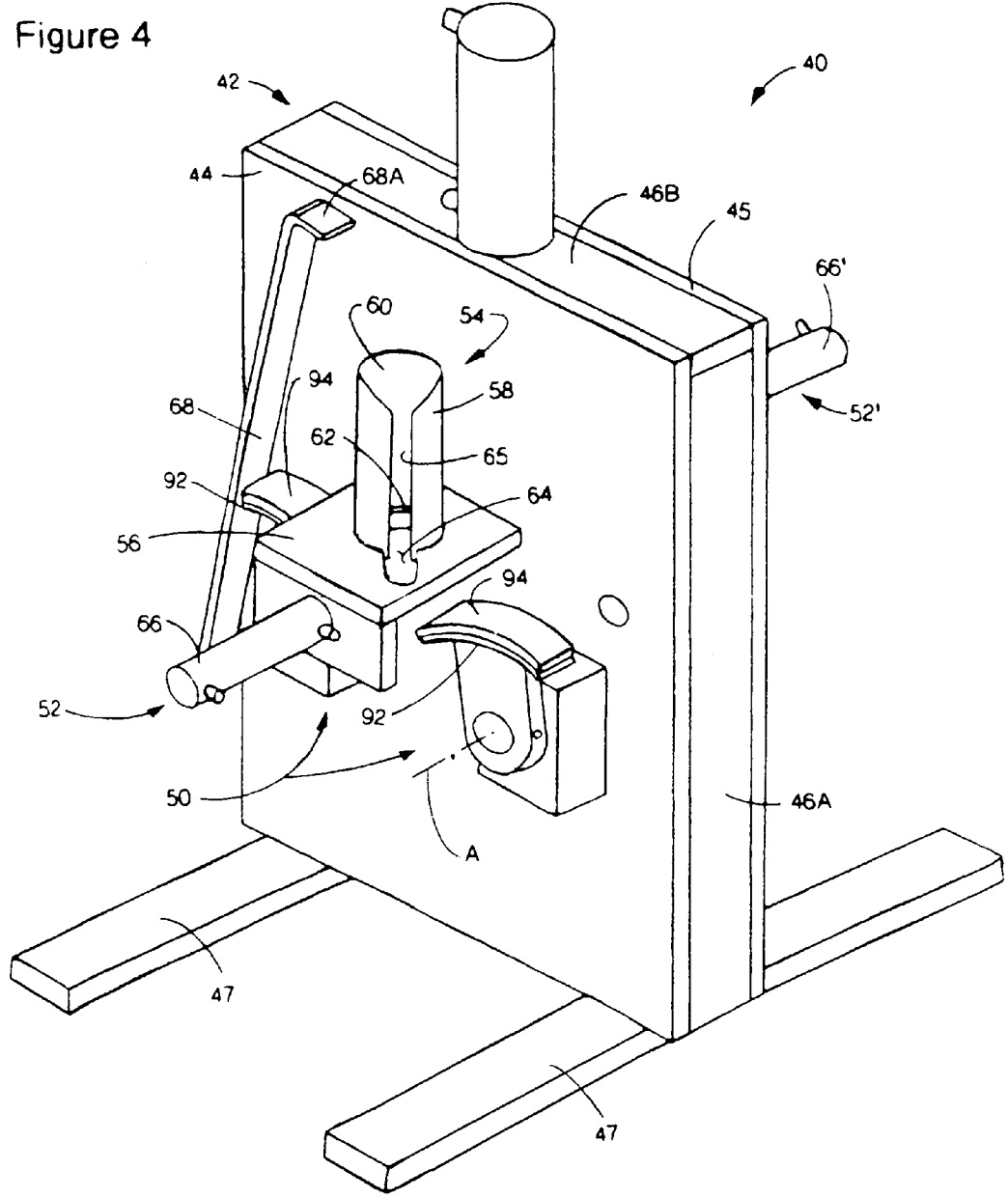
FIG. 4 is the perspective of FIG. 3 with a housing of the apparatus and teat cup assembly removed.

Referring now to FIGS. 3 and 4, an apparatus indicated generally at 40, used for assembling and disassembling shell 12 and liner 14 of teat cup assembly 10 according to one embodiment of the invention is shown. The apparatus 40 includes a left cover plate 44, a right cover plate 45, front spacer panel 46A, top spacer panel 46B, back spacer panel 46C, and bottom spacer panel 46D (see, FIG. 6) located between, and spacing apart, the left cover plate 44, the right cover plate 45, and feet 47 supporting the center frame in an upright position. The center frame 42 encloses part of a mechanism (to be described hereinafter) that drives operation of the apparatus (see FIG. 6). A housing, generally indicated at 48, encloses other operating components of the apparatus including a pulling mechanism, indicated generally at 50, and a cutter mechanism, indicated generally at 52 (shown in FIG. 4 with the housing 48 removed), both of which will be more fully described below. Those of ordinary skill in the art will readily appreciate the construction and operation of teat cup assemblies 10, previously described herein. Accordingly, additional details of construction and operation of the teat cup assembly 10 will not be described herein.

Figure 5:
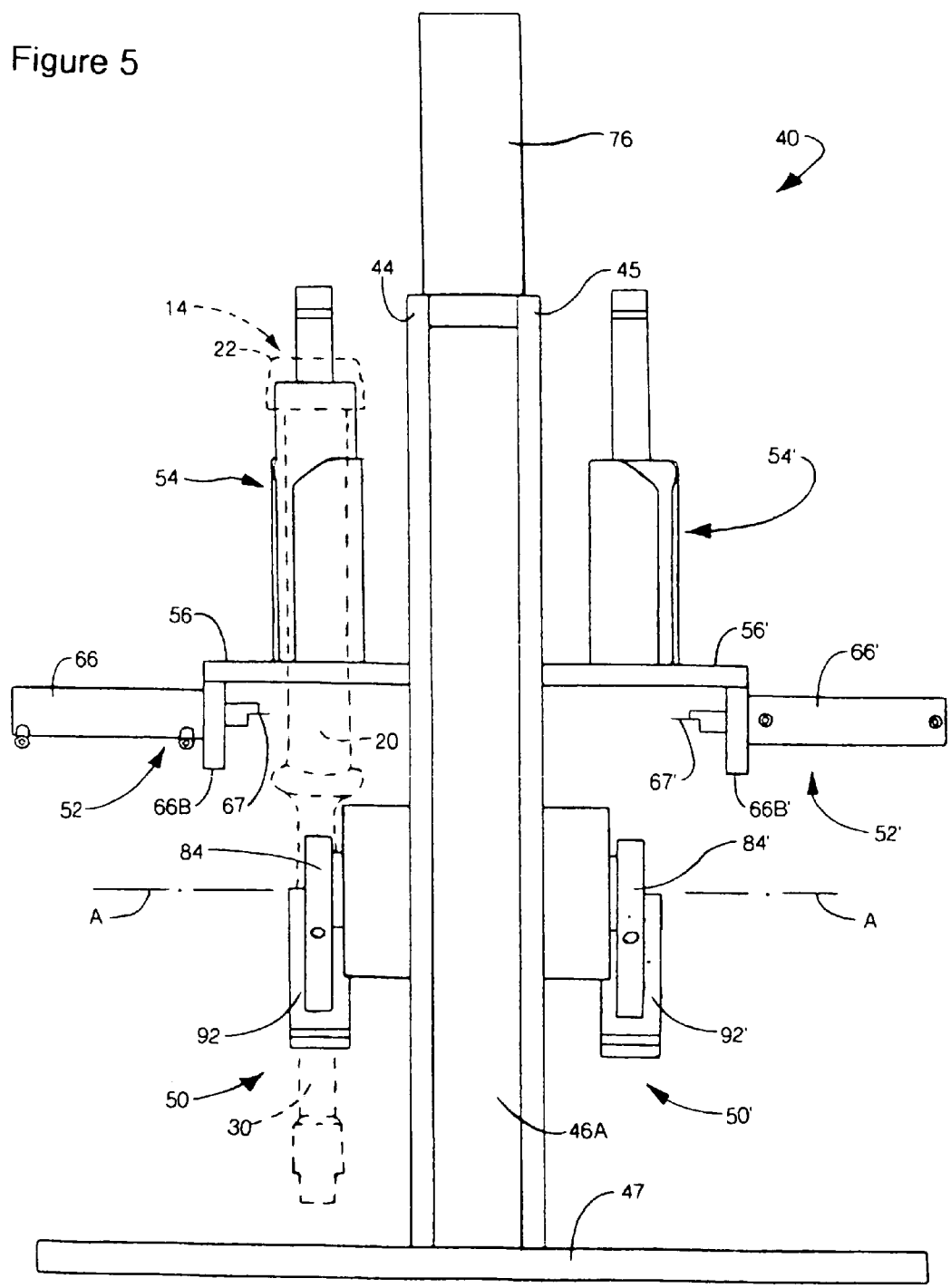

A teat cup assembly receiving fixture, generally indicated at 54, projects upward through the top surface of the housing 48. The teat cup assembly receiving fixture 54 is mounted on a platform 56 cantilevered from the left cover plate 44 and comprises a generally cylindrical receiving tube 58 open at an upper end 60 and having an internal rim 62 (FIG. 4) forming a small opening 64 at the lower end thereof. The small opening 64 extends through the platform 56. The receiving fixture 54 is configured to receive and hold the shell 12 of the teat cup assembly 10, with or without the liner 14. The receiving tube 58 has a diameter slightly larger than the diameter of the shell 12 so that the shell 12 can be received into the tube 58 through the upper end 60 and rest on the internal rim 62 to hold the shell within the receiving fixture 54. A fixture slot 65 in the receiving tube 58 is configured to accommodate the air tube 19 when the teat cup assembly 10 is inserted into the receiving fixture 54. The platform 56 of the teat cup assembly receiving fixture 54 is fixed to the left cover plate 44 using suitable brackets and fasteners (not shown), although other means of fixing the platform 56 may be used without departing from the scope of the invention. The apparatus 40 has the described teat cup receiving fixture 54 and associated pulling mechanism 50 and cutter mechanism 52 on the left side of the center frame 42, and a substantially identical second teat cup receiving fixture 54' and associated pulling mechanism 50' and cutter mechanism 52' on the right side of the center frame 42 such that the apparatus can assemble or disassemble shells 12 and liners 14 of two teat cup assemblies 10 simultaneously (see FIG. 5). Corresponding parts on the right side of the apparatus 40 (as seen in FIG. 5 and FIG. 5A) are designated by the same reference numeral with the addition of a prime. Any apparatus capable of assembling and/or disassembling one or more shells 12 and liners 14 does not depart from the scope of this invention by reason of the number of shells and liners handled at the same time.

The cutter mechanism 52 (shown on the left side of FIG. 5A) comprises a cutter cylinder 66 having a rod 66A (broadly, "a blade driving device") and a blade 67 mounted on the free end of the rod 66A. The cutter cylinder 66 pushes the blade 67 toward the left cover plate 44 to cut the barrel section 20 of the liner 14 (as shown in phantom in FIG. 5A) when disassembling the teat cup assemblies 10. On the left side of FIG. 5A, the liner 14 (in phantom) is shown with the pulling mechanism 50 fully rotated, the cutter rod 66A of the cutter mechanism 52 fully extended, and the barrel section 20 severed. In the illustrated embodiment, the cutter cylinder 66 is a modified Model NR091.5DXP manufactured by Bimba available from John Henry Foster Company of St. Louis, Mo. Naturally, air cylinders are not the only type of driving device coming within the scope of the invention. Driving devices could include any actuator which may apply adequate force to move the blade 67 toward the left cover plate 44 to cleave the liner 14. The cutter cylinder 66 is mounted on a plate 66B attached to and depending from a free end of the platform 56.

A catcher 68 is pivotally mounted on the left cover plate 44 and extends through the housing 48 via catcher slot 69 (FIG. 3). A finger 68A projects laterally outwardly from the catcher 68 and can be positioned generally above the teat cup assembly receiving fixture 54. The catcher 68 is configured to pivot between a first position (shown in FIG. 7) wherein the finger 68A is positioned away from the open end of the receiving fixture 54 so that the teat cup assembly 10 may be freely inserted or removed from the receiving fixture 54 and a second position (FIGS. 8 and 9) wherein the finger 68A is adjacent to the top of the teat cup assembly 10 in the receiving fixture 54 during either the assembly or disassembly cycle. The catcher 68 is positioned above the teat cup assembly 10 so that when the liner 14 is cut in two, the upper barrel section 20 of the liner 14 is retained within the receiving fixture 54. One skilled in the art will appreciate that other methods of preventing the liner 14 from springing from the receiving fixture 54 when cut can be used without departing from the scope of the invention. Moreover, the catcher 68 could be eliminated in another embodiment of the invention (not shown).

Figure 6:
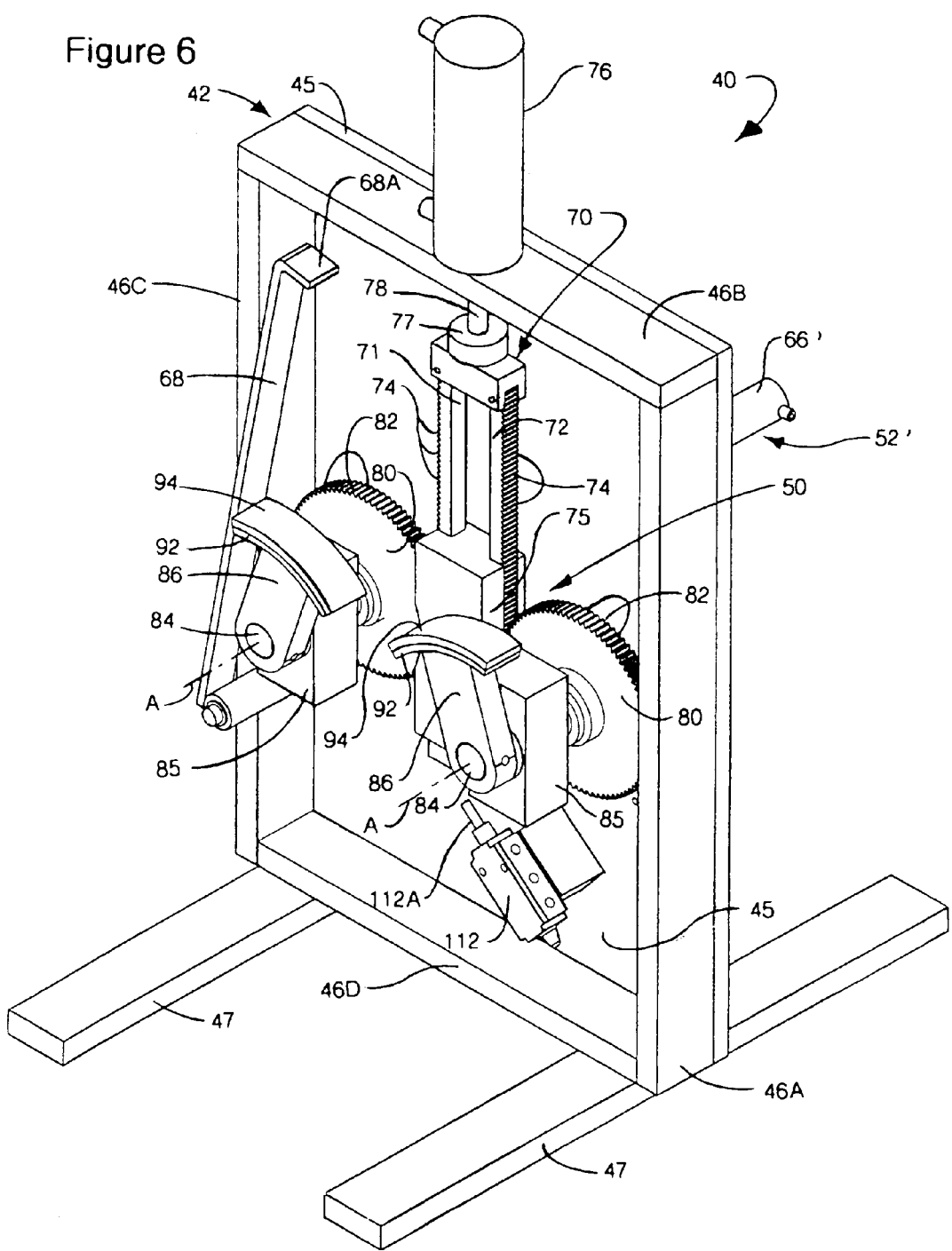
FIG. 6 is the perspective of FIG. 4 with a cutter and a left cover plate removed.

FIG. 6 illustrates the apparatus 40 with the housing 48 and the left cover plate 44 removed for clarity. The pulling mechanism 50 comprises a rack 70 positioned within the center frame 42. In the illustrated embodiment, the rack 70 is a Model #14½° PA 00540G 88165 24" RA 16×2 rack available from Motion Industries of Quincy, Ill. Opposite sides 71, 72 of the rack 70 have teeth 74 along the length of the rack 70. An air cylinder 76 (broadly, a "rack driving device") is connected to the rack 70 by a rod 78 having a Magnaloy alignment coupler 77 and provides the driving force to move the rack 70 upward and downward. A guide block 75 receives and guides the rack 70 in its vertical movements. In the illustrated embodiment, the air cylinder 76 is a modified Model 505DXP air cylinder manufactured by Bimba available from John Henry Foster Company of St. Louis, Mo. It will be appreciated that other actuators may be used without departing from the scope of the present invention.

The pulling mechanism 50 further includes a pair of pinion gears 80 rotatably mounted on the left and right cover plates 44, 45. As shown, the pinion gears are each a Model #14½° PA 00540G 91118 51684, available from Motion Industries of Quincy, Ill. Each pinion gear 80 has teeth 82 around the outer circumferential surface thereof for engaging the teeth 74 of the rack 70. Movement of the rack 70 in either direction causes the pinion gears 80 to counterrotate. A shaft 84 extends from the rotational center of each of the pinion gears 80. Each shaft 84 is fixed for conjoint rotation with its respective pinion gear 80, and is supported by a pillow block 85. An arm 86 projects radially from an outward end of the shaft 84 and is attached to the shaft with a pin. Other structures for connecting the arm 86 to the shaft 84 may be used without departing from the scope of the invention. As will be explained more fully below, rotation of each pinion gear 80 causes the arm 86 to pivot about an axis of rotation A of the gear 80. The pulling mechanism 50' on the right side of the center frame 42 has the same components as described for the pulling mechanism 50. Arms 86' and arcuate shoes 92' are mounted for conjoint rotation with respective ones of the same pinion gears 80 which mount the shafts 84. Thus, the air cylinder 76 simultaneously operates pulling mechanisms 50 and 50'.

A shoe 92, (broadly, "a gripping device") is fixed to a distal end of each of the arms 86. The shoe 92 is configured to engage the lower section 30 of the liner 14 that extends below the opening 17 at the lower end 16 of the shell 12. In one embodiment, the shoe 92 has a generally arcuate shape. The curve of the arc extends in a direction around the axis A. Thus, when the shoes 92 are in opposed relation, the space between remains substantially constant. Other shapes for a shoe (not shown), such as a series of straight segments forming a generally curved section and the like are contemplated. Additionally, a shoe can be bulb-shaped or other suitable shape for engaging the liner 14. The arcuate shoe 92 suitably has a length between about 2 and about 6 inches, and more suitably has a length between about 3 and about 5 inches. The shoe 92 desirably has an engagement surface 94 for contacting the liner 14 and is made of a suitable high friction material, such as fiber-cork pads available from McMaster-Carr Supply Company of Chicago, Ill. The engagement surface 94 is also resiliently deformable, providing cushioning to prevent damage to the liner 14.

Figure 10:
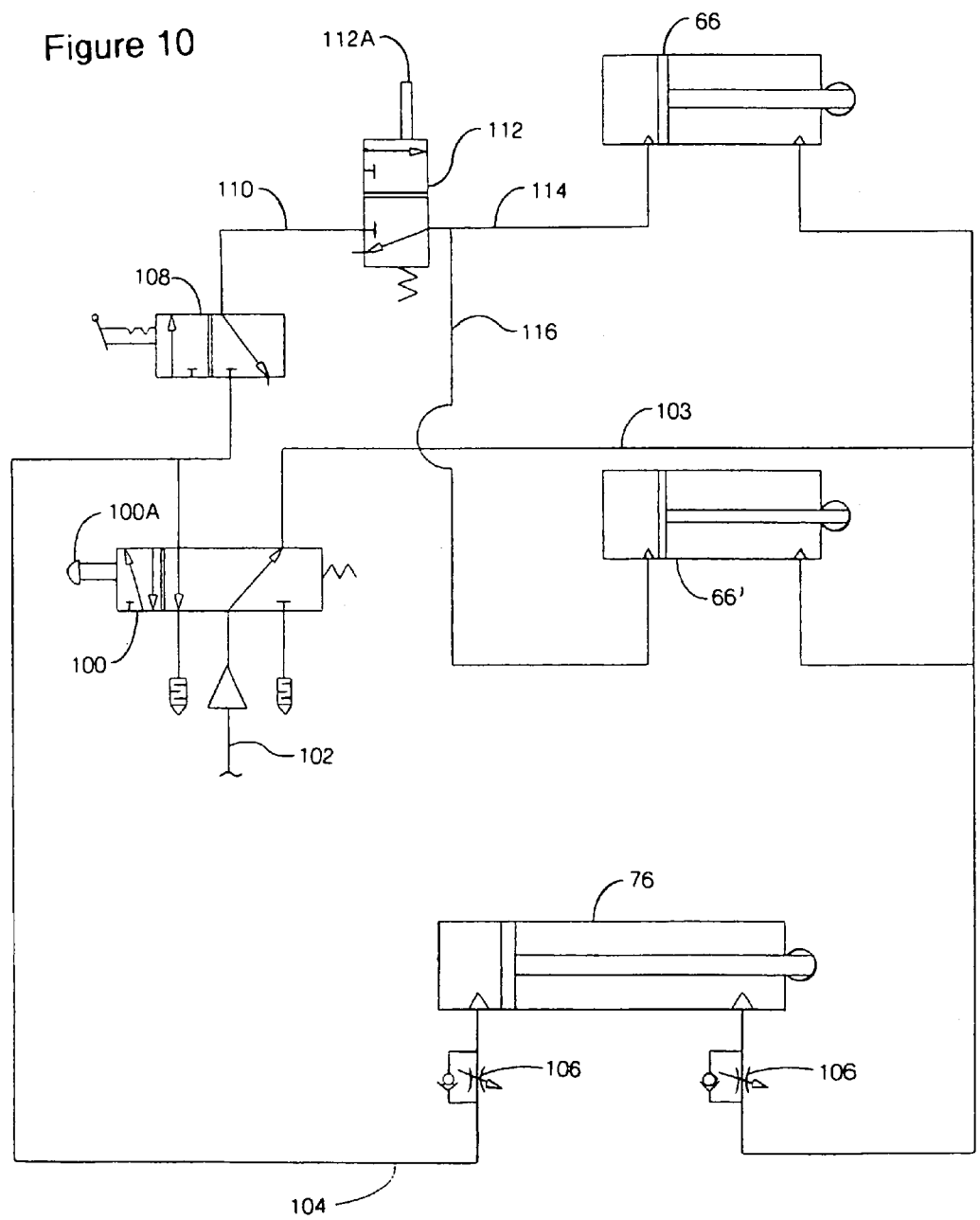
FIG. 10 is a schematic fluid circuit of the apparatus.

Operation of the apparatus 40 is controlled using a fluid circuit illustrated schematically in FIG. 10. The circuit includes an activating switch 100 capable of being connected to a supply of compressed air through line 102. In the default position of the activating switch 100, the pressurized air is directed to the air cylinder 76 and cutter cylinders 66, 66' via line 103 so that all cylinders are retracted. By depressing and holding down knob 100A, air is redirected through line 104 to the air cylinder 76 to cause the main rod 78 to extend. Air cylinder 76 has flow controls 106 associated with it that are selected to cause the rod 78 to extend (and retract) at a predetermined rate. At the same time, air is also directed to a cutter selector switch 108, which as shown in FIG. 10 is open so that air cannot pass toward the cutter cylinders 66, 66'. The cutter selector switch 108 is set this way for installation of the liner 14 into the shell 12.

Turning the cutter selector switch 108 to the closed position to activate the cutter mechanisms 52, 52' allows air from the activating switch 100 to pass through the cutter selector switch 108 through line 110 to delay switch 112. Air cannot pass through the delay switch 112 until it is tripped when the rod 78 of the air cylinder 76 reaches its full extension. In one embodiment, a trip control 112A of the delay switch 112 is positioned so that one of the arms 86 engages the trip control 112A at the bottom end of its motion (i.e., in the position shown in FIG. 9). When the delay switch 112 is tripped, air is allowed to pass to the cutter cylinders 66, 66' through lines 114 and 116 for cutting the liner 14 to disassemble it from the shell 12. After the knob 100A is released, the fluid circuit returns to its start position with the rods 66A, 66A' and 78 of the air cylinders 66, 66', and 76 in a retracted position. Other control arrangements, including those employing electronic controls may be used without departing from the scope of the present invention.

Figure 7:
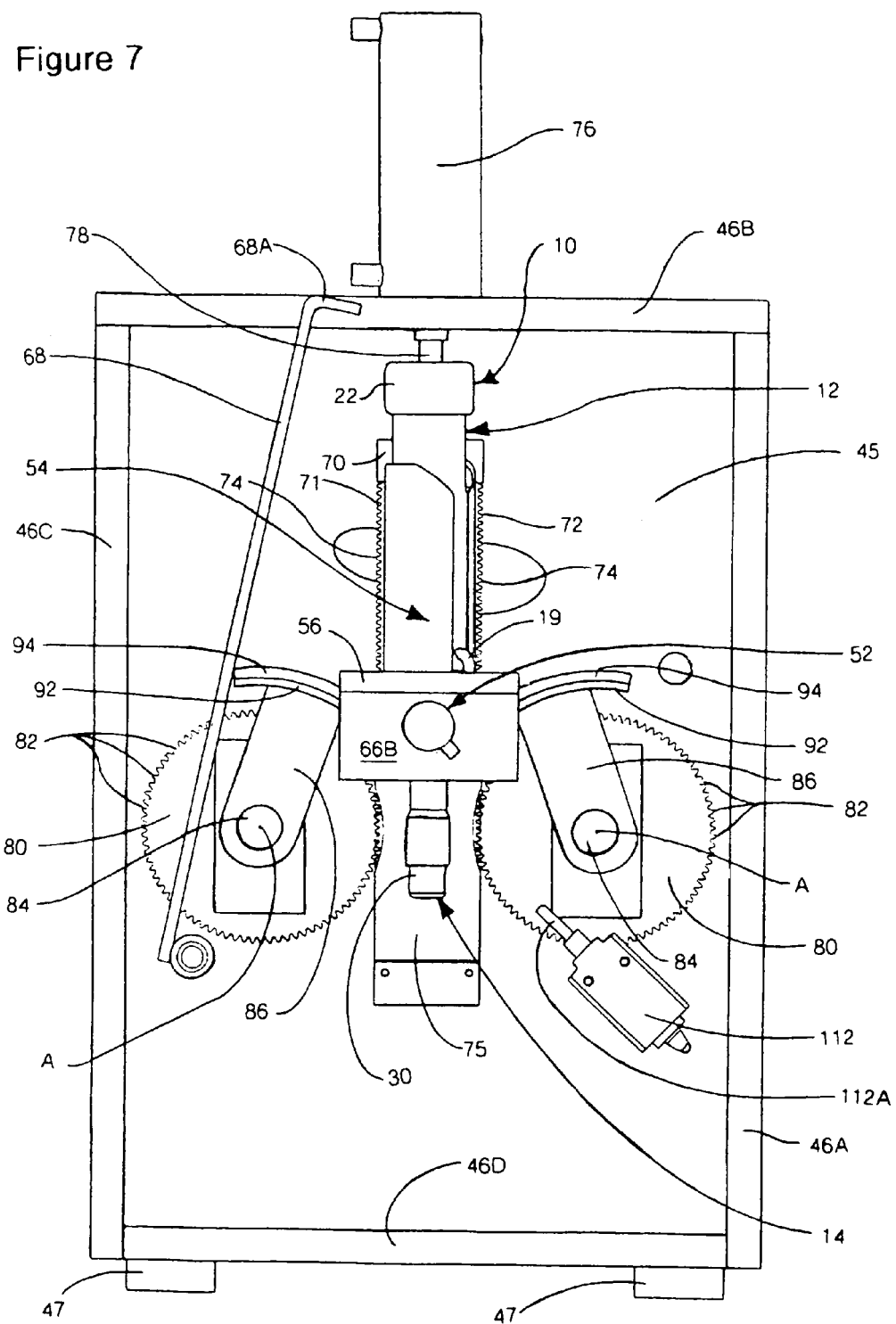
FIG. 7 is a left side elevation of the apparatus of FIG. 3 with the pulling mechanism in an initial orientation.
Figure 8:
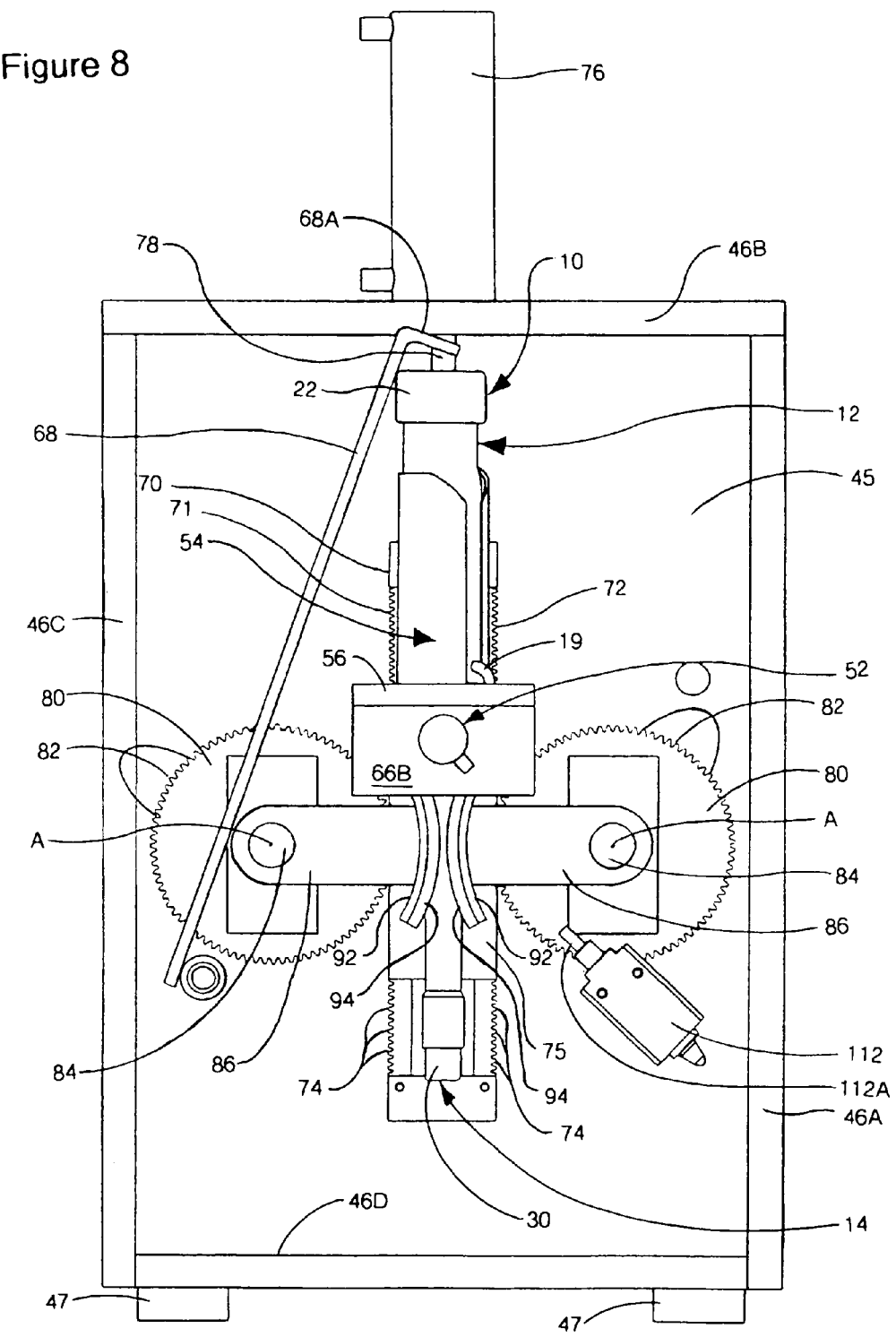
FIG. 8 is a left side elevation of FIG. 6 with the pulling mechanism in an intermediate orientation pulling a liner.
Figure 9:
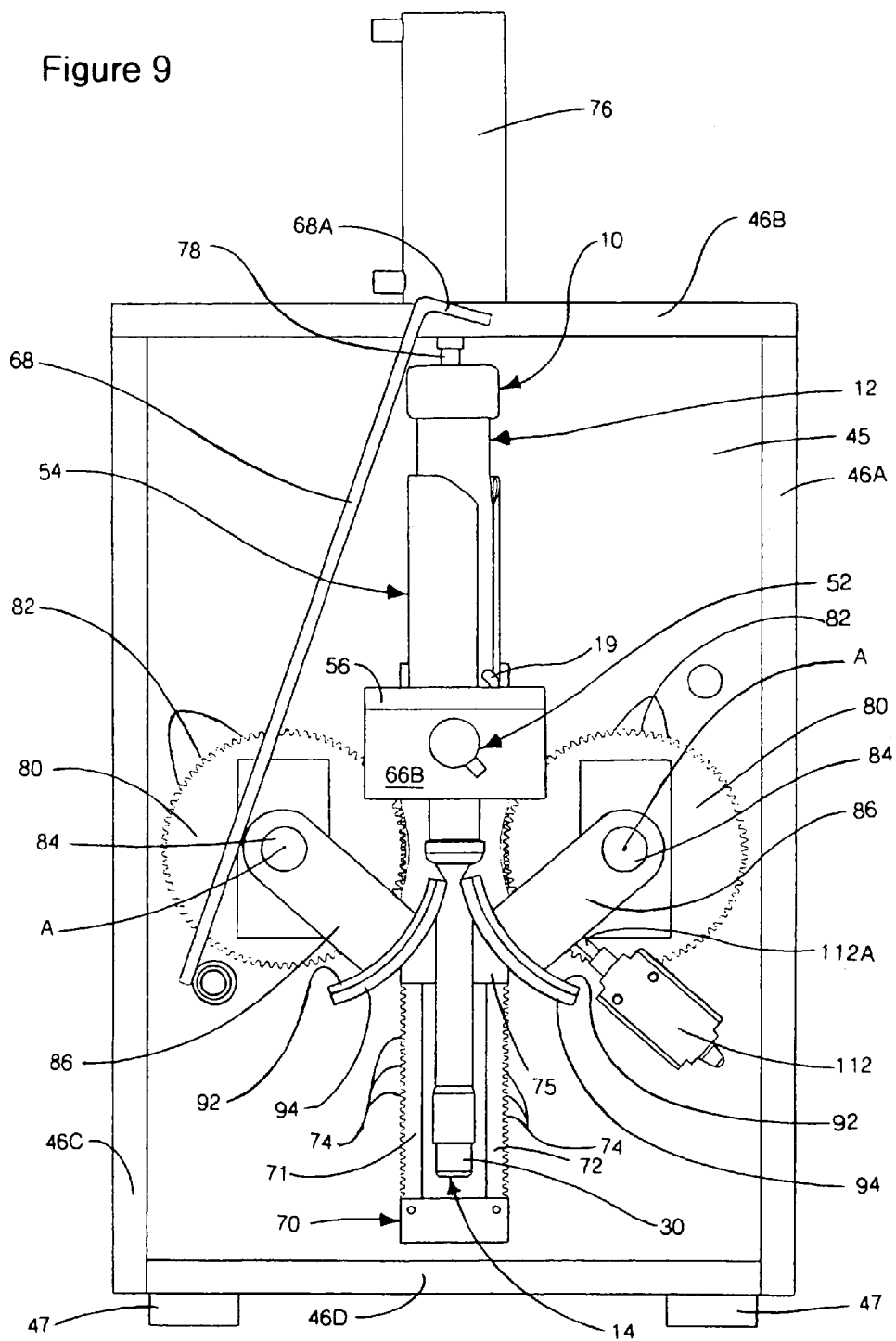
FIG. 9 is a left elevation of FIG. 6 with the pulling mechanism in a final orientation stretching the liner below the shell.

Referring now to FIGS. 7–9, upward and downward movement of the rod 78 of the air cylinder 76 causes corresponding upward and downward movement of the rack 70. The linear movement of the rack 70 is translated into rotational movement of the pinion gears 80 through engagement of the teeth 74 of the rack with the teeth 82 of the pinion gears. For example, as the rack 70 is moved downward, one pinion gear 80 (i.e., the left gear in FIG. 7) rotates in a clockwise direction and the other pinion gear 80 (i.e., the right gear in FIG. 7) rotates in a counterclockwise direction causing the shoes 92 to move toward each other and down. When the rack 70 is moved in the upward direction, the one pinion gear 80 rotates in the counterclockwise direction and the other pinion gear 80 rotates in the clockwise direction causing the shoes 92 to move upward and then away from each other.

As seen in FIG. 7, the arcuate shoes 92 begin in an upward orientation such that a gap between the arcuate shoes 92 is wider than the lower section 30 of the liner 14. The engagement gripping surfaces 94 of the shoes 92 are not opposed to each other. In this start position, the air cylinder 76 has fully retracted the rod 78 and raised the rack 70 to its upwardmost position. The catcher 68 is pivoted back so that the finger 68A is not above the teat cup receiving fixture 54. The teat cup assembly 10 is placed in the receiving fixture 54. The lower section 30 of the liner 14 extends downward and is free to pass through the platform 56 and between the arcuate shoes 92. Downward movement of the rack 70 causes the pinion gears 80 to rotate about their axes of rotation. The shoes 92 move toward each other and the engagement gripping surfaces 94 engage the lower section 30 of the liner 14 and pinch the liner 14 there between as shown in FIG. 8. Further downward movement of the rack 70 causes the shoes 92 to pivot to a generally downward orientation as shown in FIG. 9. The engagement gripping surfaces 94 of the shoes 92 frictionally engage the liner 14 and pull the liner 14 in a downward direction. The elastomeric nature of the liner material allows the liner 14 to stretch and elongate without breaking.

To assemble a liner 14 with a shell 12, rim 18 of the shell 12 is inserted into cuff 26 of the liner 14. The shell 12 is then placed into the receiving fixture 54 so that the lower section 30 projects below the opening 17 in the bottom of the shell 12, but the sealing ring 28 is located within the shell 12 above the opening 17. This description will focus on the assembly of one liner 14 with one shell 12 by pulling mechanism 50 on one side of the apparatus 40, it being understood that a second liner and shell (not shown) could be simultaneously assembled by the apparatus 40 by the pulling mechanism 50' on the opposite side. Thus, the shell 12 and liner 14 are unassembled and there is no sealed chamber within the shell 12 for the application of a pulsating vacuum needed to milk a cow. The cutter selector switch 108 is turned to the open position so that the cutter mechanisms 52, 52' are inactive. The knob 100A of the activating switch 100 is depressed and held down to initiate extension of the rod 78 from the air cylinder 76. The shoes 92 engage the liner 14 and pull it in a downward direction until the sealing ring 28 on the liner 14 snaps through the opening 17 in the lower end 16 of the shell 12. The sealing ring 28 of the lower section 30 of the liner 14 bears around the opening 17 and seals the liner 14 with the shell 12. The cuff 26 of the head section 22 of the liner 14 bears around the rim 18 and seals the liner 14 with the shell 12. In this way, the sealed chamber between the shell 12 and liner 14 is formed. The knob 100A is released, causing the air cylinder 76 to retract the rod 78 and return the shoes 92 to the start position releasing the liner 14. The upper mark 27 on the head section 22 of the liner 14 is now aligned with the lower mark 29 on the lower section 30 of the liner 14. The assembled teat cup assembly 10 can be removed from the receiving fixture 54 and used for milking.

The apparatus 40 can also disassemble the shell 12 and liner 14. When disassembling the teat cup assemblies 10, the cutter selector switch 108 is turned to the closed position so that the cutter mechanism 52 will be active. The teat cup assembly 10, with the liner 14 sealingly attached to the shell 12, is dropped into the receiving fixture 54. The lower section 30 of the liner 14 extends through and below the platform 56. The knob 100A of the activating switch 100 is pushed down and held, causing the shoes 92 to move from the raised position in FIG. 7 together and downward. The shoes 92 engage the liner 14 as they move downward, and are shown in FIG. 8 at a mid-stroke position somewhat after the initial engagement with the liner. The shoes 92 continue downward, pulling liner 14 in a downward direction to the position shown in FIG. 9. The downward pull continues until the sealing ring 28 is below the blade 67 of the cutter mechanism 52 (FIG. 9). One of the shoes 92 presses the trip control 112A of the delay switch 112, causing the cutter mechanism 52 to rapidly extend to cut the liner 14 (see FIG. 5A). After releasing the knob 100A, the shoes 92 move to the upward position. The lower section 30 and part of the barrel section 20 of the liner 14 including the sealing ring 28 fall down permitting the remainder of the barrel section 20 and head section 22 of the liner 14 to be easily removed from the shell 12. The finger 68A catches the head section 22 and prevents the barrel section 20 and head section 22 of the liner 14 from flying from the shell 12 and receiving fixture 54 when the elastic tension is released upon cutting the liner 14. The shell 12 can then be reassembled with a new liner 14 as described previously. FIG. 7 shows the delay switch 112 not engaged, the shoes 92 retracted, the rack 70 in the up position, and the arm 86 positioned away from the receiving fixture 54. FIG. 9 shows the delay switch 112 engaged, the shoes 92 in the fully rotated position, the rack 70 in the down position, and the catcher 68 extended over the receiving fixture 54.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. Apparatus for manipulating a teat cup assembly used for milking a domestic animal, the teat cup assembly including a shell and a resilient liner adapted to receive the animal's teat, the liner being capable of extending through the shell while being retained by the shell, the apparatus comprising a frame, a fixture mounted on the frame, the fixture being sized and shaped for receiving and holding the shell having the liner therein, and a puller mounted on the frame relative to the fixture to grip and pull the liner and move the liner and shell relative to each other to stretch the liner to a position in which the liner is capable of being at least one of installed on and removed from the teat cup, wherein the puller is moveable relative to the fixture for stretching the liner, and the puller includes at least one shoe positioned relative to the fixture for pinching the liner to grip the liner and for moving away from the fixture to stretch the liner.

2. Apparatus as set forth in claim 1 wherein there are two shoes arranged in opposed relation to each other.

3. Apparatus as set forth in claim 2 wherein the shoes are mounted for pivotal motion about an axis relative to the fixture to grip and then pull the liner in a direction away from the fixture.

4. Apparatus as set forth in claim 3 wherein the shoes each have an arcuate engagement surface positioned for engaging the liner, each engagement surface curving in a direction generally about the axis of rotation of its corresponding shoe.

5. Apparatus as set forth in claim 4 wherein each of the shoes has a layer of high friction material on its engagement surface.

6. Apparatus as set forth in claim 5 further comprising a puller actuator, a rack, and pinion gears meshed with the rack, the puller actuator being adapted to selectively drive linear movement of the rack in two opposite directions to cause the pinion gears to rotate and pivot the shoes.

7. Apparatus as set forth in claim 6 wherein the fixture constitutes a first fixture and the shoes constitute first shoes, and wherein the apparatus further comprises a second fixture sized and shaped for receiving and holding a shell of another teat cup assembly, and second shoes mounted in opposed relation for pivotal motion about an axis relative to the fixture to grip and then pull another liner of said other teat cup assembly in a direction away from the second fixture.

8. Apparatus as set forth in claim 7 wherein the second shoes are attached for rotation with respective ones of the pinion gears, generally on opposite sides of the pinion gears from corresponding ones of the first shoes.

9. Apparatus as set forth in claim 8 further comprising first and second cutters arranged relative to the first and second fixtures, respectively, for selectively cutting each of the liners and said other liner into separate pieces.

10. Apparatus as set forth in claim 9 wherein the cutter comprises a cutter actuator and a blade mounted on the cutter actuator.

11. Apparatus as set forth in claim 10 wherein the puller actuator and the cutter actuator are each pneumatic cylinders.

12. Apparatus as set forth in claim 1 further comprising a cutter arranged relative to the fixture for selectively cutting the liner into separate pieces.

13. Apparatus as set forth in claim 1 wherein the puller is disposed relative to the fixture so that the puller grips the liner at a location outside of the shell.

14. Apparatus as set forth in claim 1 wherein the puller is adapted to elongate the liner.

15. Apparatus for use in assembling and disassembling a liner from a shell of a teat cup assembly used in a dairy cow milking machine, the apparatus comprising a frame, a fixture sized and shaped for receiving and holding the shell with the liner projecting from the shell, the fixture being mounted on the frame, a puller mounted on the frame and disposed relative to the fixture to grip the liner and move the liner and shell relative to each other to stretch the liner, and a cutter mounted on the frame in a position relative to the fixture such that the cutter is adapted to cut the liner gripped by the puller.

16. Apparatus as set forth in claim 15 wherein the puller comprises a pair of opposed shoes positioned relative to the fixture for pinching the liner between them to grip the liner and for moving away from the fixture to stretch the liner.

17. Apparatus as set forth in claim 16 wherein the shoes are mounted for pivotal motion about an axis relative to the fixture to grip and then pull the liner in a direction away from the fixture.

18. Apparatus as set forth in claim 17 wherein the shoes each have an arcuate engagement surface positioned for engaging the liner, each engagement surface curving in a direction generally about the axis of rotation of its corresponding shoe.

19. Apparatus as set forth in claim 18 further comprising a puller actuator, a rack, and pinion gears meshed with the rack, the shoes being mounted on respective pinion gears for rotation therewith, the puller actuator being adapted to selectively drive linear movement of the rack in two opposite directions to cause the pinion gears to rotate and pivot the shoes.

* * * * *